(12) United States Patent
LaPlant et al.

(10) Patent No.: US 10,888,932 B1
(45) Date of Patent: Jan. 12, 2021

(54) ASSEMBLY AND METHOD FOR MICRODRILLING A TUBE

(71) Applicant: HONEYWELL FEDERAL MANUFACTURING & TECHNOLOGIES, LLC, Kansas City, MO (US)

(72) Inventors: Steven Todd LaPlant, Kansas City, MO (US); Dillon James McCullough, Kansas City, MO (US); Suzanne Christina Varughese, Kansas City, MO (US); Mark Alexander Stich, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 83 days.

(21) Appl. No.: 16/444,508

(22) Filed: Jun. 18, 2019

(51) Int. Cl.
| | |
|---|---|
| *B23B 41/14* | (2006.01) |
| *B23B 35/00* | (2006.01) |
| *B23B 41/00* | (2006.01) |
| *B26F 1/00* | (2006.01) |

(52) U.S. Cl.
CPC .............. *B23B 41/14* (2013.01); *B23B 35/00* (2013.01); *B23B 35/005* (2013.01); *B23B 41/003* (2013.01); *B26F 1/003* (2013.01); *B23B 2215/72* (2013.01); *B23B 2220/00* (2013.01); *B23B 2250/00* (2013.01); *B23B 2250/12* (2013.01); *B23B 2270/08* (2013.01); *B23B 2270/54* (2013.01)

(58) Field of Classification Search
CPC .......... B23B 35/00–005; B23B 41/003; B23B 41/14; B23B 2215/72; B23B 2220/00; B23B 2250/00; B23B 2270/54; B23B 39/06; B23B 39/04; B23B 2270/08; B23P 25/00; Y10T 29/4981–49812; B26F 1/0015; B26F 1/003; B26F 1/0053; B26F 1/0061; B26F 1/16; B65H 75/285
See application file for complete search history.

(56) References Cited

U.S. PATENT DOCUMENTS

| | | | |
|---|---|---|---|
| 3,448,548 A | | 6/1969 | Watson |
| 3,550,248 A | * | 12/1970 | Fretz ..................... B23D 47/04 29/423 |
| 5,974,846 A | | 11/1999 | Ash |
| 6,365,871 B1 | | 4/2002 | Knowles et al. |
| 2013/0203320 A1 | | 8/2013 | Ghalambor |

\* cited by examiner

*Primary Examiner* — Matthew P Travers
(74) *Attorney, Agent, or Firm* — Hovey Williams LLP

(57) ABSTRACT

An assembly and method for drilling micro holes in a tube including an outer wall having opposing open ends and forming an inner channel. The method includes the steps of submerging the tube in water so the water fills the inner channel, retaining the water in the inner channel, freezing the water in the inner channel so as to form an ice backing in the inner channel, and drilling through the outer wall such that the ice backing supports the outer wall and prevents the outer wall from deforming or distorting near the hole location.

16 Claims, 3 Drawing Sheets

ASSEMBLY AND METHOD FOR MICRODRILLING A TUBE

GOVERNMENT INTERESTS

This invention was made with Government support under Contract No.: DE-NA0002839 awarded by the United States Department of Energy/National Nuclear Security Administration. The Government has certain rights in the invention.

BACKGROUND

Micro holes are often drilled into outer walls of small Fluoronated Ethylene Propylene (FEP) tubes via micro-sized drill bits. At this scale, the drill bits deform or distort the tubes, causing unclean and uneven cuts. Unclean cuts create debris and remnant flaps, which can at least partially block the micro holes. Uneven cuts result in imperfect hole shapes, which can induce unwanted stresses and improper fluid flow through the micro holes.

SUMMARY

Embodiments of the invention solve the above-mentioned problems and other problems and provide a distinct advancement in the art of micro hole drilling. More particularly, the invention provides a method of drilling accurate micro holes that are free of debris and remnant flaps.

An embodiment of the invention is a method of drilling micro holes in a tube with frozen water acting as a backer. The tube may be made of plastic, polymer, fluoropolymer, fluorinated ethylene propylene (FEP), or any other suitable material.

The tube is submerged in a water bath and rotated to remove bubbles and air pockets so as to fill its inner channel with water. Distilled water or other freezable fluids may be used. Ends of the tube may then be plugged so as to retain water in the inner channel.

The tube is then wound around a drilling mandrel in a helical shape with the open ends positioned near a top side of the drilling mandrel. The tube may also be retained on the drilling mandrel via retention clips, adhesives, adhesive strips, elastic bands, or the like.

The drilling mandrel and the tube are then placed on a spindle of a holding fixture so as to form an assembly, and the tube ends are unplugged. The drilling mandrel should be oriented so that the open ends are facing up so water does not drain when the tube ends are unplugged.

The assembly is then placed in a freezer so the water in the tube freezes. In one embodiment, freezing may take approximately 45 minutes. The assembly may then be removed from the freezer.

The drilling mandrel is then removed from the holding fixture. The drilling mandrel may then be placed on a spindle of a micro drill press. The micro drill press may then be turned on so that it ramps up to a desired speed.

A micro drill bit (e.g., 0.010 inch in diameter) is then plunged into the outer wall of the tube to form a drill micro hole. The drill bit may pass through the outer wall into the ice (i.e., the frozen water). The drill bit may then be retracted from the ice and the outer wall.

The drilling mandrel may then be rotated about and shifted along its longitudinal axis so as to align the drill bit with a new hole location. The drill bit may then be plunged into the outer wall of the tube at other hole locations so as to form a number of micro holes in the outer wall of the tube.

The ice is then thawed and removed from the inner chamber of the tube. For example, the inner chamber may be blown with air, $N_2$, or any other suitable gas. The outer surface of the outer wall may also be wiped with a cleaning cloth (e.g., a Kimwipe cloth). The micro holes may also be inspected for quality.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
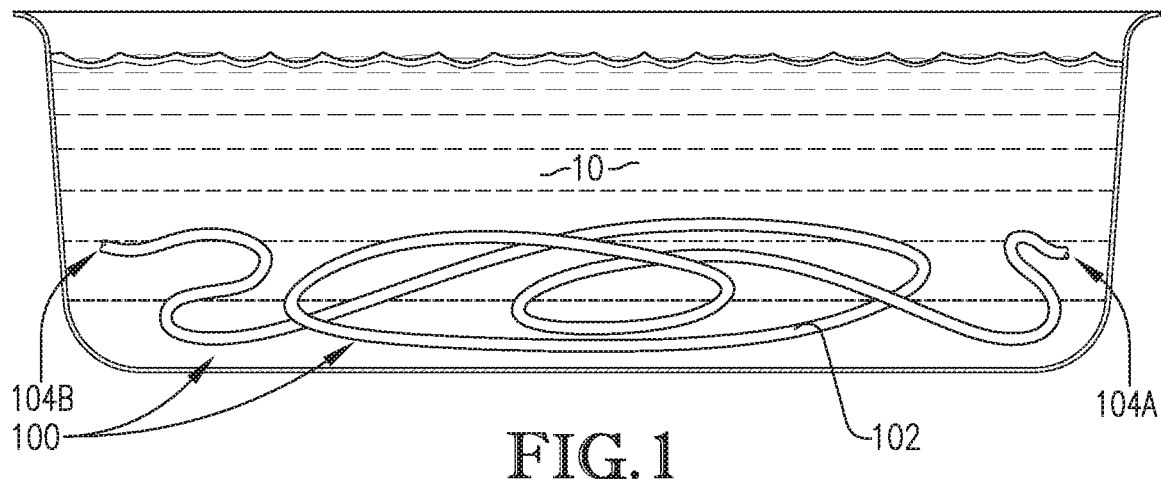
FIG. 1 is an elevation view of a tube submerged in a water bath in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 5:
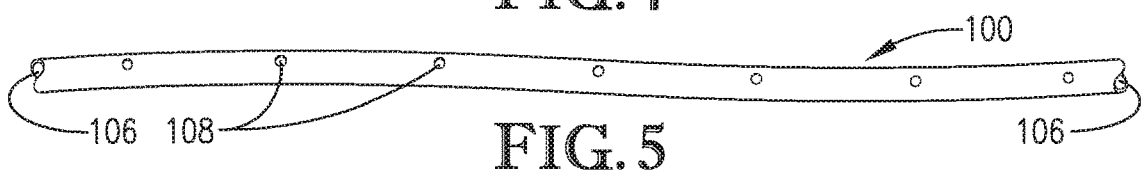
FIG. 5 is an elevation view of the tube of FIG. 1 having a plurality of micro holes in accordance with an embodiment of the invention.
Figure 6:
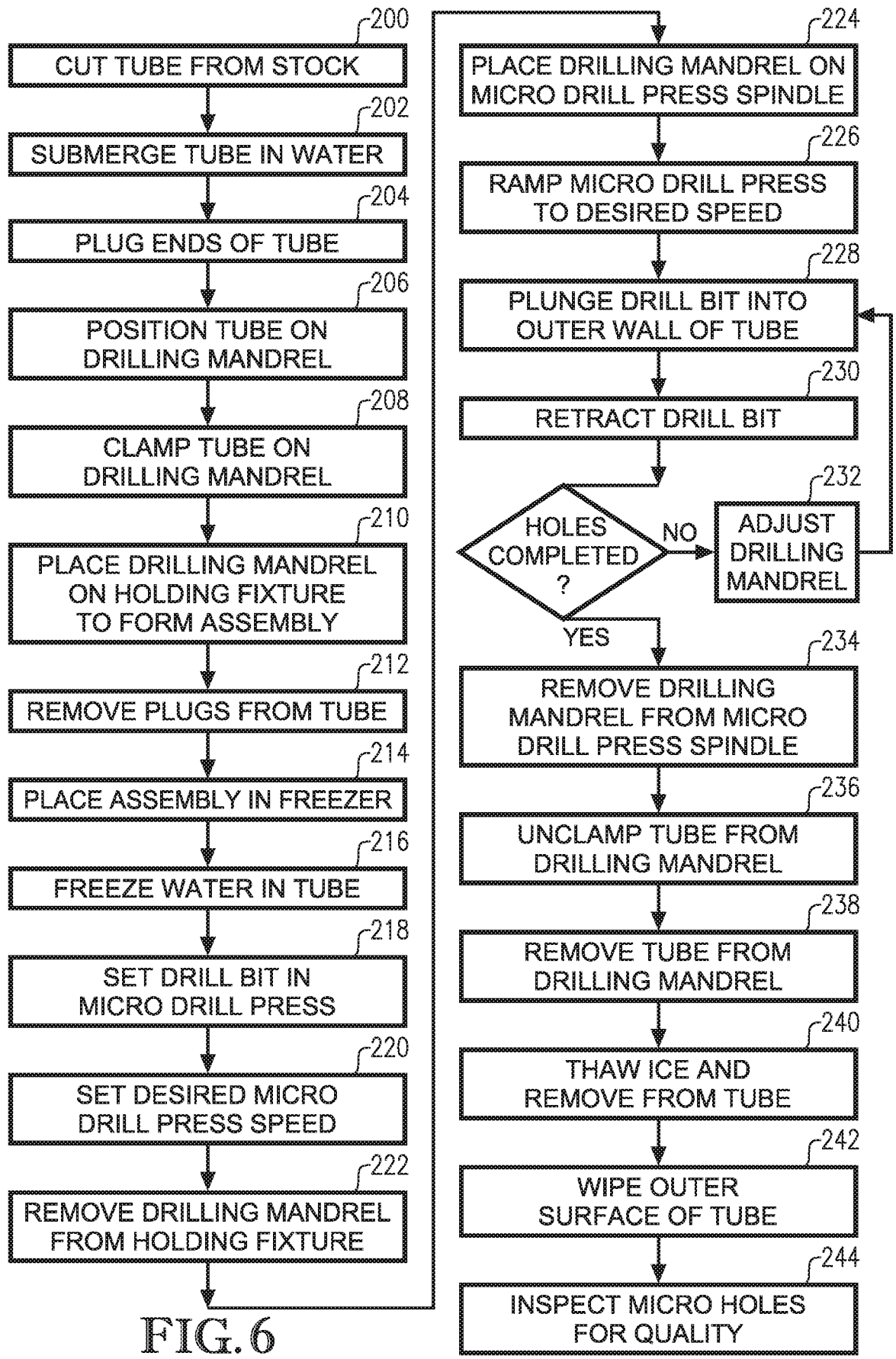
FIG. 6 is a flow diagram of a method of drilling micro holes in accordance with an embodiment of the invention.

Turning to FIG. 5, and with reference to FIGS. 1-4, a system and method for drilling micro holes in a tube 100 is illustrated. The tube 100 may include an outer wall 102 having opposing open ends 104 and forming an inner channel 106 is illustrated. The tube 100 may be made of plastic, polymer, fluoropolymer, fluorinated ethylene propylene (FEP), or any other suitable material.

The method may be implemented via a system including a water bath 10, first and second plugs 12A,B, a drilling mandrel 14, a number of retention clips 16, a holding fixture 18, and a spindle 20. The drilling mandrel 14, retention clips 16, and holding fixture 18 may be used in certain method steps to form an assembly 22.

The water bath 10 may be distilled water or other freezable fluids held in a tank, a tub, a bucket, or the like. The water bath 10 should be large enough to completely submerge the tube 100.

The plugs 12A,B are configured to be inserted into the opposing open ends 104A,B of the tube 100 to completely seal the opposing open ends 104A,B. The plugs 12A,B may be made of rubber, plastic, cork, metal, or any other suitable material.

The drilling mandrel 14 receives the tube 100 thereon. In some embodiments, the drilling mandrel 14 is substantially cylindrical and oriented horizontally on its longitudinal axis for allowing the tube 100 to be around the drilling mandrel 14 in a helix.

The retention clips 16 retain the tube 100 on the drilling mandrel 14. The retention clips 16 may be brackets, pins, fasteners, or the like. Alternatively, adhesives, adhesive strips, elastic bands, or the like may be used.

The holding fixture 18 includes a spindle 20 for receiving the drilling mandrel 14 and retaining the drilling mandrel 14 in a selected orientation during certain steps. The holding fixture 18 may be a support base, a frame, a stand, or the like.

A method of drilling micro holes in the tube 100 will now be described in more detail. First, the tube 100 may be cut from tube stock, as shown in block 200. In one embodiment, the tube 100 may be cut to a length of approximately four inches to approximately six inches longer than a final desired length.

The tube 100 may then be submerged in the water bath 10 and rotated to remove bubbles and air pockets so as to fill the inner channel 106 with water from the water bath 10, as shown in block 202. Distilled water or other freezable fluids may be used.

First and second plugs 12A,B may then be at least partially inserted into the open ends 104A,B so as to plug the open ends 104 closed, as shown in block 204. This retains the water in the inner channel 106 for subsequent method steps.

Figure 2:
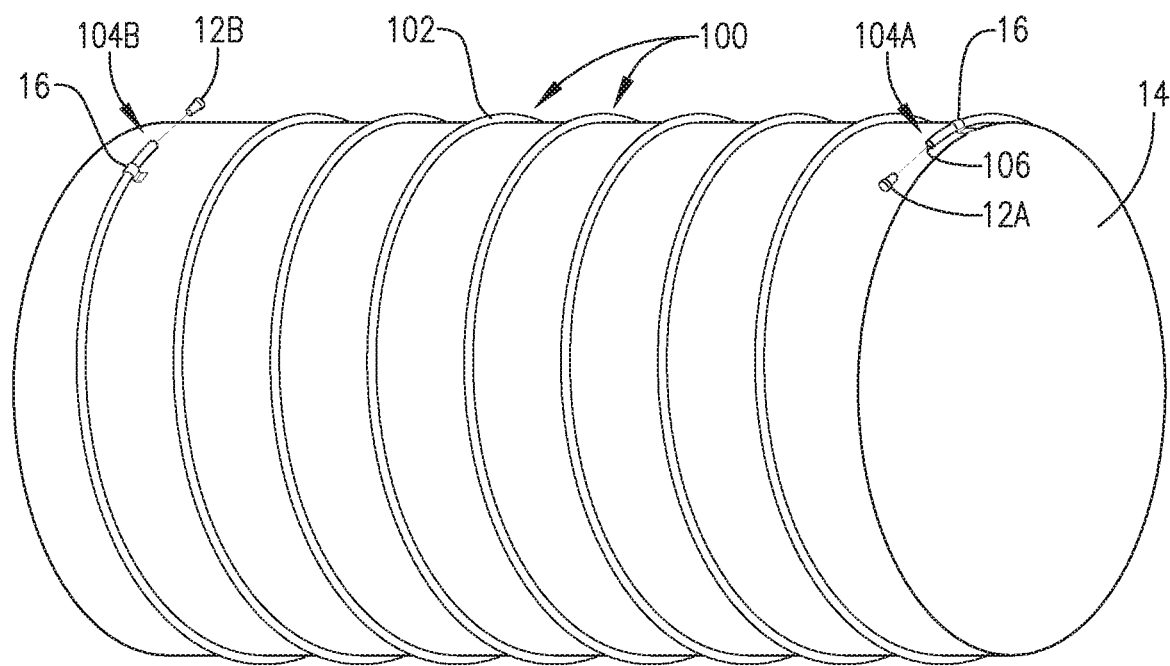
FIG. 2 is a perspective view of the tube of FIG. 1 positioned on a drilling mandrel in accordance with an embodiment of the invention.
Figure 3:
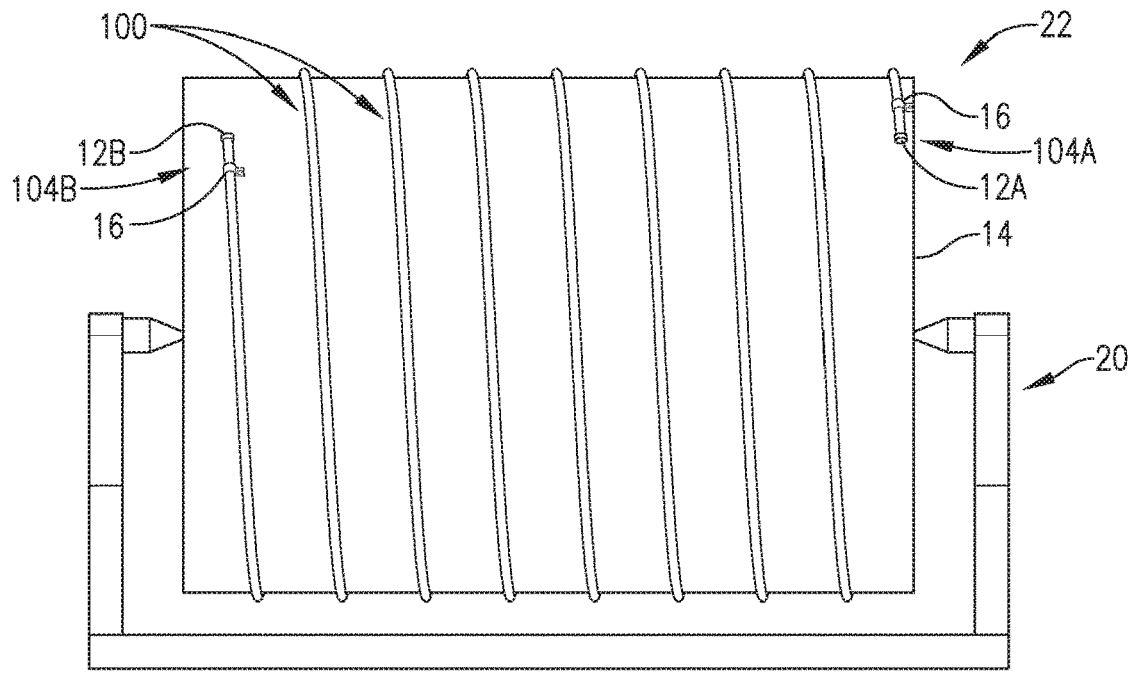
FIG. 3 is an elevation view of the tube and drilling mandrel positioned on a holding fixture spindle in accordance with an embodiment of the invention.
Figure 4:
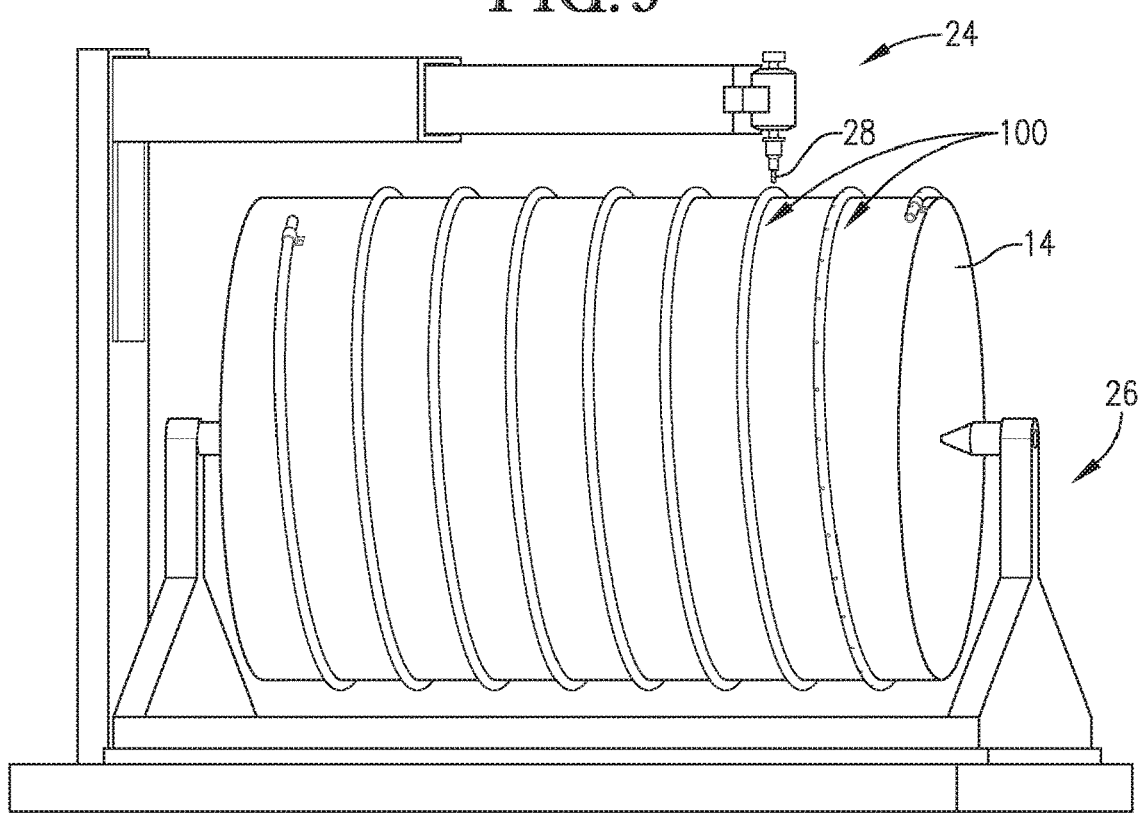
FIG. 4 is a perspective view of the tube and drilling mandrel positioned in a drill press in accordance with an embodiment of the invention.

The tube 100 may then be positioned on the drilling mandrel 14 (or a cutting mandrel), as shown in block 206. In one embodiment, the tube 100 may be wound around the drilling mandrel 14 in a helical shape. The open ends 104 may be positioned near a top side of the drilling mandrel 14, as shown in FIG. 2. The tube 100 may be oriented so that approximately two inches to approximately three inches overhang a cut line location.

The retention clips 16 may then be clamped down on the tube 100 so as to retain the tube 100 on the drilling mandrel 14, as shown in block 208. Alternatively, adhesives, adhesive strips, elastic bands, or the like may be used to retain the tube 100 on the drilling mandrel 14.

The drilling mandrel 14 (with the tube 100 retained thereon) may then be placed on the spindle 20 of the holding fixture 18 so as to form the assembly 22, as shown in block 210. The drilling mandrel 14 should be oriented so that the open ends 104 are facing up so water does not drain when the plugs 12A,B are removed. The plugs 12A,B may then be removed from the open ends 104A,B, as shown in block 212.

The assembly 22 may then be placed in a freezer, as shown in block 214. In one embodiment, the freezer is set to a temperature of minus sixty degrees Fahrenheit. Other temperatures may also be used. The water may then be frozen, as shown in block 216. In one embodiment, freezing may take approximately 45 minutes. The assembly 22 may then be removed from the freezer.

A micro drill press 24 may then be set up with a 0.010 inch drill bit 28 or a similar size drill bit, as shown in block 218. A desired speed of the micro drill press 24 may also be set, as shown in block 220.

The drilling mandrel 14 may then be removed from the holding fixture 18, A as shown in block 222. The drilling mandrel 14 may then be placed on a spindle 26 of A the micro drill press 24 and oriented via an alignment pin so that the drill bit 28 is positioned above a first hole location, as shown in block 224. The micro drill press 24 may then be turned on so that it ramps up to the desired speed, as shown in block 226.

The drill bit 28 may then be plunged into the outer wall 102 of the tube 100 so as to remove material from the outer wall 102, as shown in block 228. The drill bit 28 may pass through the outer wall 102 into the ice (i.e., the frozen water). The drill bit 28 may then be retracted from the ice and the outer wall 102, as shown in block 230.

If more micro holes are needed, the drilling mandrel 14 may then be rotated about and shifted along its longitudinal axis so as to align the drill bit 28 with a new hole location, as shown in block 232. Steps 228-232 may be repeated for additional micro holes.

The drilling mandrel 14 may then be removed from the spindle 26 of the micro drill press 24, as shown in block 234. The retention clips 16 may then be removed from the tube 100, as shown in block 236. The tube 100 may then be removed from the drilling mandrel 14, as shown in block 238.

The ice may then be thawed and removed from the inner chamber 106 of the tube 100, as shown in block 240. For example, the inner chamber 106 may be blown with air, $N_2$, or any other suitable gas. The outer surface of the outer wall 102 may also be wiped with a cleaning cloth, as shown in block 242. The micro holes 108 may also be inspected for quality, as shown in block 244.

The above-described assembly and method provide several advantages. For example, the ice acts as a backing for drilling micro holes 108, which reduces debris and remnant flaps that typically block micro holes. The ice backing also improves hole quality. The assembly 22 simplifies and improves replicability of the water freezing steps. The drilling mandrel 14 allows for more efficient drilling and more accurate hole placement and hole spacing.

Although the invention has been described with reference to the embodiments illustrated in the attached drawing figures, it is noted that equivalents may be employed and substitutions made herein without departing from the scope of the invention as recited in the claims.

Having thus described various embodiments of the inven- tion, what is claimed as new and desired to be protected by Letters Patent includes the following:

1. A method of drilling a hole in a tube including an outer wall having opposing open ends and forming an inner channel, the method comprising the steps of:
    filling the inner channel with water;
    wrapping the tube around a drilling mandrel in a helix shape;
    orienting the opposing open ends upward;
    freezing the water in the inner channel so as to form ice therein;
    plunging a drill bit into the outer wall while the tube is wrapped around the drilling mandrel so as to remove material from the outer wall; and
    retracting the drill bit from the outer wall.

2. The method of claim 1, wherein the drill bit forms holes of 0.010 inches in diameter.

3. The method of claim 1, wherein the step of filling the inner channel with water includes submerging the tube in the water, the method further comprising the steps of inserting plugs into the open ends after filling the inner channel with water and removing the plugs from the open ends after orienting the opposing open ends upward.

4. The method of claim 1, further comprising the step of clamping the tube onto the drilling mandrel via retention clips.

5. The method of claim 1, further comprising the step of positioning the mandrel on a spindle of a holding fixture so as to form an assembly and placing the assembly in a freezer.

6. The method of claim 5, further comprising the step of removing the mandrel from the spindle of the holding fixture and positioning the mandrel on a spindle of a drilling base.

7. The method of claim 1, further comprising the steps of cutting the tube from tubing stock to a length of between four inches and six inches longer than a final desired length, the step of wrapping the tube around the drilling mandrel including overhanging between two inches to three inches of each opposing end of the tube over cut line locations.

8. The method of claim 1, further comprising the step of removing residual water from the inner channel by passing dinitrogen through the inner channel.

9. A method of drilling a hole in a tube including an outer wall having opposing open ends and forming an inner channel, the method comprising the steps of:
    filling the inner channel with water;
    wrapping the tube around a drilling mandrel in a helix shape
    orienting the opposing open ends upward;
    freezing the water in the inner channel so as to form ice therein;
    plunging a drill bit through the outer wall into the ice in the inner channel while the tube is wrapped around the drilling mandrel so as to remove material from the outer wall;
    retracting the drill bit from the ice and the outer wall;
    melting the ice so that only residual water remains in the inner channel; and
    removing the residual water from the inner channel.

10. The method of claim 9, wherein the drill bit forms holes of 0.010 inches in diameter.

11. The method of claim 9, wherein the step of filling the inner channel with water includes submerging the tube in the water, the method further comprising the steps of inserting plugs into the open ends after filling the inner channel with water and removing the plugs from the open ends after orienting the opposing open ends upward.

12. The method of claim 9, further comprising the step of clamping the tube onto the drilling mandrel via retention clips.

13. The method of claim 9, further comprising the step of positioning the mandrel on a spindle of a holding fixture so as to form an assembly and placing the assembly in a freezer.

14. The method of claim 13, further comprising the step of removing the mandrel from the spindle of the holding fixture and positioning the mandrel on a spindle of a drilling base.

15. The method of claim 9, further comprising the steps of cutting the tube from tubing stock to a length of between four inches and six inches longer than a final desired length, the step of wrapping the tube around the drilling mandrel including overhanging between two inches to three inches of each opposing end of the tube over cut line locations.

16. A method of drilling a hole in a tube including an outer wall having opposing open ends and forming an inner channel, the method comprising the steps of:
    submerging the tube in water so as to fill the inner channel with water;
    inserting plugs into the open ends;
    orienting the opposing open ends upward;
    positioning the tube on a drilling mandrel in a helix shape such that the open ends are near a top of the drilling mandrel;
    clamping the tube onto the drilling mandrel via retention clips;
    positioning the drilling mandrel on a spindle of a holding fixture so as to form an assembly;
    removing the plugs from the open ends;
    placing the assembly in a freezer;
    freezing the water in the inner channel so as to form ice therein;
    plunging a drill bit through the outer wall into the ice in the inner channel so as to remove material from the outer wall;
    retracting the drill bit from the ice and the outer wall;
    melting the ice so that only residual water remains in the inner channel; and
    removing the residual water from the inner channel.

\* \* \* \* \*